Patented Feb. 8, 1949

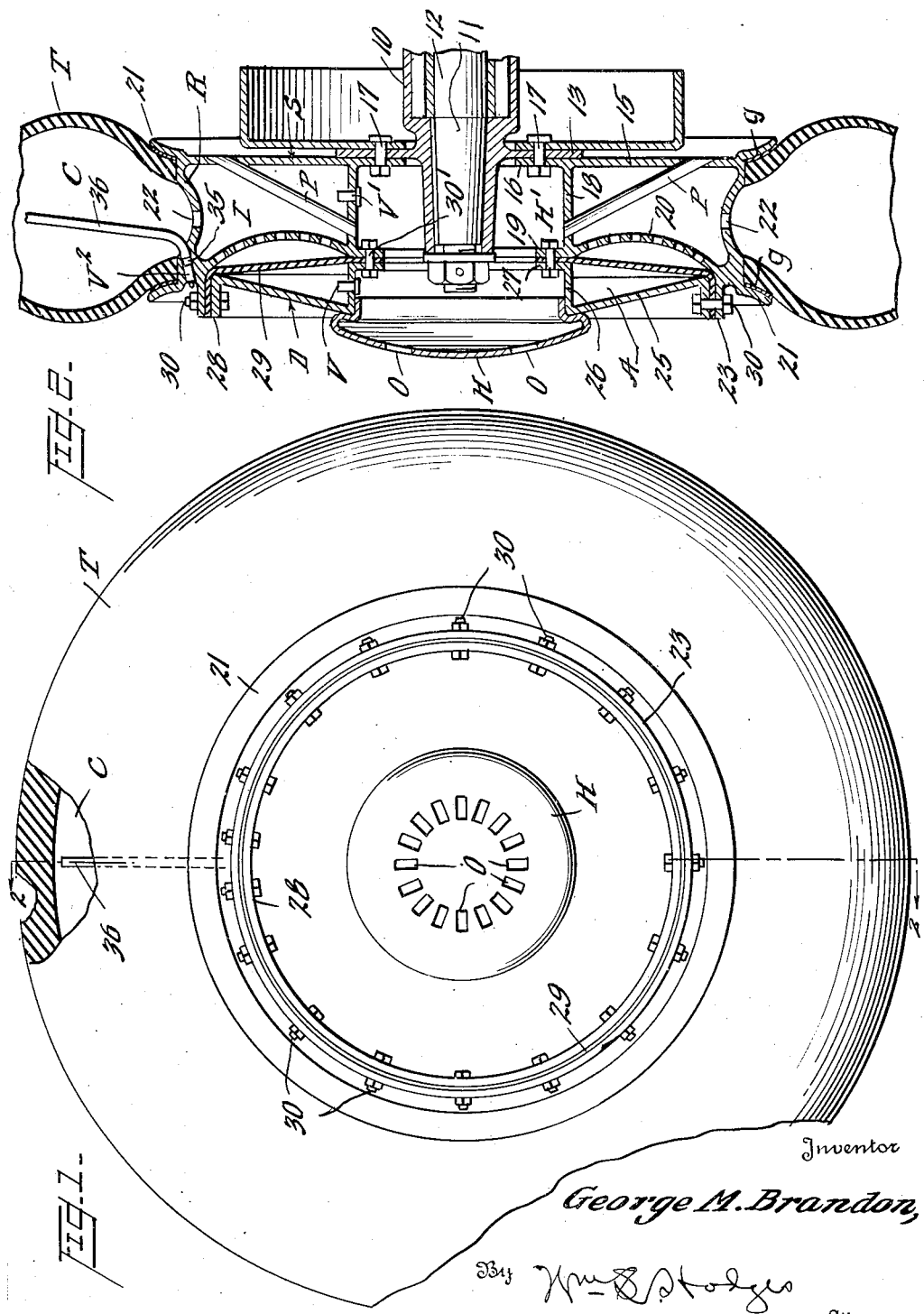

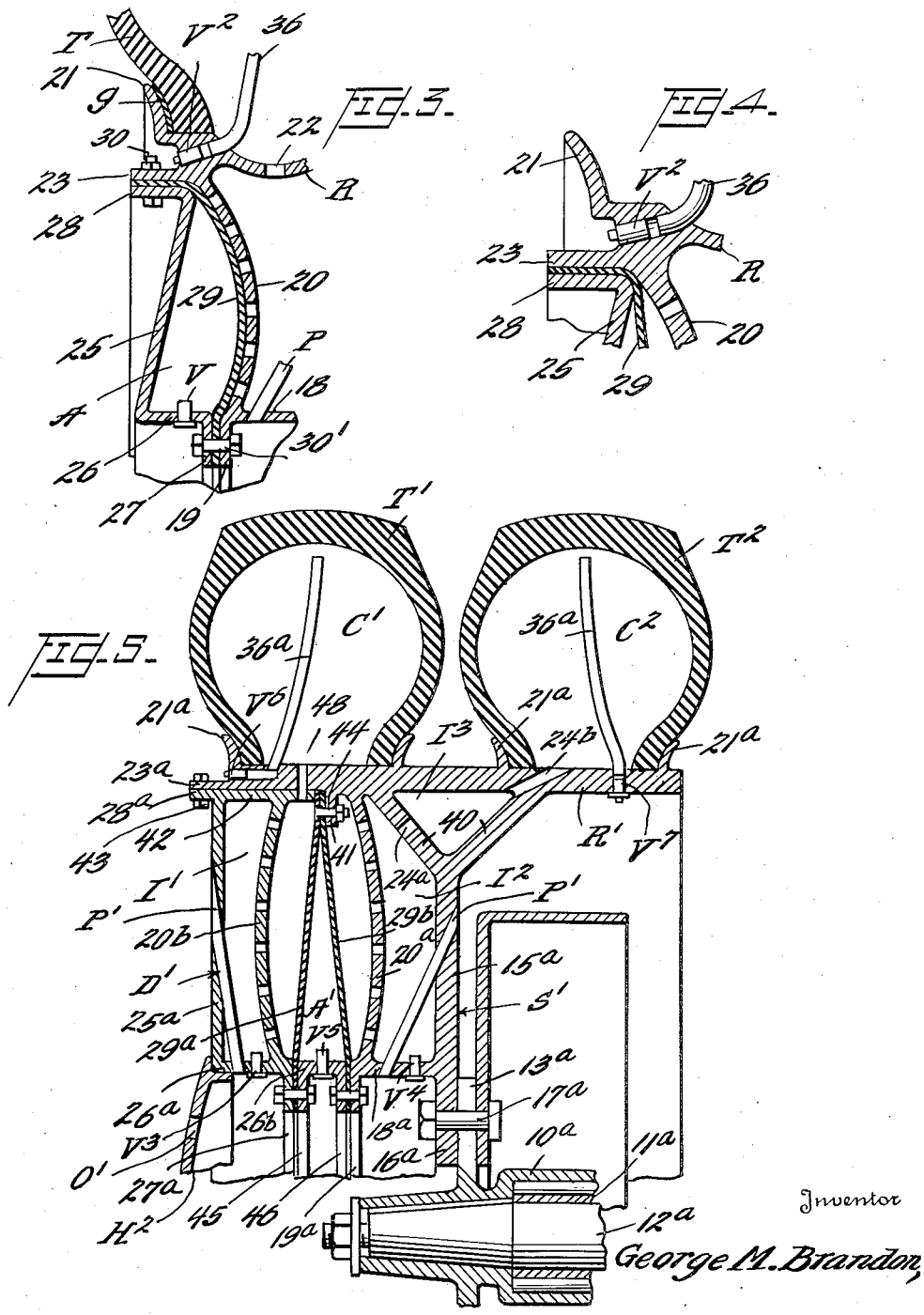

2,461,257

UNITED STATES PATENT OFFICE 2,461,257

CUSHION VEHICLE WHEEL

George M. Brandon, Tallahassee, Fla.

Application November 28, 1944, Serial No. 565,493

4 Claims. (Cl. 152—10)

This invention is a metal wheel of a design primarily for use on motor vehicles of all types, but not limited to this particular use.

One of the objects of the invention is to provide a wheel of the character referred to, so constructed and arranged as to effectively cushion the wheel and the vehicle supported thereby from all shocks, irrespective of origin and intensity encountered by the vehicle during normal operation. A further object is to provide a wheel having inflatable tires for cushioning such shocks, but in a manner similar to the functioning of the well-known pneumatic tire, but which is so constructed and arranged as to dispense with the need of inner tubes. Another object is to provide simple means for maintaining a yieldable pressure upon the inflating medium employed to fill and to distend the tires. An additional object is to provide efficient means for cooling the inflating fluid in such manner as to prevent overheating of the tire and the wheel. An important object is to provide a simple means whereby the invention may be applied to dual wheels of the type commonly employed for supporting heavy trucks.

The invention will be hereinafter fully set forth and particularly pointed out in the claims.

In the accompanying drawings—

Figure 1 is a front elevation illustrating a wheel constructed in accordance with the invention.

Figure 2 is a vertical sectional view thereof, on the line 2—2, Figure 1.

Figure 3 is a detail sectional view illustrating the pressure diaphragm in its extreme distended position.

Figure 4 is a detail sectional view illustrating the means for sealing the tires.

Figure 5 is a vertical sectional view illustrating the invention applied to a dual wheel construction.

Referring to the drawings, S designates the main or supporting wheel section and D represents the separable wheel section of a vehicle wheel of the demountable type. The section S is provided with a hub sleeve 10 to receive the spindle forming a part of the axle 12. The sleeve 10 is provided with an annular supporting flange 13 which extends radially outward therefrom. The separable section D is provided with a chamber A, while the wheel section has an annular reservoir I, the chamber A being designed to receive a cushioning pressure medium, such as air for example, which may be introduced into said chamber through a valve V. The reservoir I is designed to receive an inflating medium, such as water for instance, which is introduced into said chamber by means of the valve V'. It is to be understood that although air and water are specifically mentioned, it is not intended to limit the invention to these specific elements.

The reservoir I is constructed with an inside wall 15 having a central flange 16, positioned to engage the flange 13, and to be removably secured thereto by bolts 17, or other suitable securing means. Integrally connected with the inside wall 15 is a tire receiving rim R and a bottom wall 18, the latter having an annular flange 19 extending radially toward the axis of the wheel, the valve V' being located in said bottom wall. Integrally connected with the rim R and the bottom wall 18 is a perforated concavo-convex backing plate 20. It is to be understood that the parts 15, 16, R, 18, 19 and 20 may each be constructed separately in suitable manner, such for instance by die pressing, and then connected to each other in the assembled position shown, by welding operations so as to provide the complete structure. Inasmuch as these operations come within the scope of common practice and ordinary skill in the art, the parts are shown as assembled integral structures. Before assembling the parts and securing them together, as stated, a series of pipes P are positioned diagonally and radially across the reservoir I, one end of each pipe communicating with the outside atmosphere through an opening in the wall 15, and the other end communicating with hub-receiving space through an opening in the bottom wall 18. The rim R is provided with the usual tire engaging flanges 21 similar in structure and design to those commonly employed to grip the edges of the outer casing of a standard type pneumatic tire casing. Such a tire casing T is shown as gripped between the rim flanges so as to provide an annular cushioning chamber C, restricted communication between said reservoir C and the chamber I being established by means of openings 22 formed in the rim R. The rim R is also provided with an integral annular flange 23 spaced radially inward from the rim and extending axially outward.

The chamber A is constructed of a metal outside wall 25 having an integral bottom member 26 within which the valve V is located. A flange 27 extends radially inward from the bottom 26 at a position to register with and engage the flange 19. The peripheral edge of the outside wall 25 is provided with an annular flange 28 so positioned as to register with the flange 23. An elastic diaphragm 29 forms the dividing wall between the chamber A and reservoir I, said diaphragm having its peripheral edge clamped between the flanges 23 and 28 by means of bolts 30, and the other edge is securely clamped between flanges 19 and 27 by means of bolts 30'. Said bolts 30 and 30' also constitute the means for uniting the wall members of the chamber A and reservoir I, and the diaphragm whereby the chamber and reservoir are separated by an elastic expansible wall.

It will be noted that the registering bottom walls 18 and 26 of the chamber A and reservoir I provide an annular space H' into which the outer end of the hub sleeve projects. The outer end of this annular space H' is normally covered by a removable hub cap H of the usual type, the outer curved wall of which is provided with louvred openings O, so positioned that while the wheel is rotating they will act as a pump so as to force currents of atmospheric air from space H' upwardly and outwardly through the pipes P. Extending through the rim R is an opening 35 in which is located a valve $V^2$ communicating with a vent pipe 36, which extends into the cushion chamber C close to a position near the tread thereof.

In practice, after the sections of the wheel body have been assembled and have been mounted on the hub 10, the chamber C will be inflated by introducing an inflation medium into the reservoir I through the valve V'. However, to do this the wheel must first be so positioned that the vent tube 36 is at its highest possible position from the ground, the wheel, of course remaining at rest during the inflation process. Any suitable inflating medium such as air, gas, water or other liquid may be employed, but it is preferred to employ water because of its ready availability and its capability of resisting shocks. While the inflating medium is being fed into the compartment I the valve $V^2$ must be open so that air within the reservoir I and chamber C may be vented through said vent tube 36 and valve $V^2$. Just as soon as a flow of inflating medium through the valve $V^2$ occurs, the valve must be closed because at this time the reservoir I will be filled with the inflating medium, the diaphragm 29 being held away from the backing plate 20 by the applied pressure. After closing the valve $V^2$, the chamber A is placed in communication with a cushioning pressure medium such as air (not shown) introduced through valve V, as commonly used to inflate pneumatic tires. As the pressure builds up within said chamber A, the diaphragm 29 is stretched by the air pressure against it, thereby building up a yieldable cushioned pressure against the body of the inflating medium within reservoir I and chamber C. Obviously, the pressure within chamber A may be regulated to any desired degree, and thereafter the diaphragm will serve as the cushioning means for all shocks applied to the inflating medium transmitted from the tire T, the inflating medium being at all times free to flow through the backing plate 20. During rotation of the wheel, incident to its travel over a roadway, the louvres act as a pump to draw atmospheric air into the space H' and to force said air through the pipes P, so that the inflating medium will be kept sufficiently cool to prevent overheating of the tire and other parts of the wheel, irrespective of speed of rotation or normal operating temperatures. If necessary a gasket $g$ may be inserted between each edge of the tire casing T and the adjacent rim flange 21, to insure against leakage of inflating medium at these locations.

Referring to Figure 5, the invention is shown as applied to a wheel of the dual type, such as is adapted and commonly employed for use with heavy trucks, buses and the like. In this form of the invention, the wheel is provided with a main or supporting section S' and a separable section D'. The section S' is provided with the hub sleeve 10a to receive the usual anti-friction hub 11a mounted upon the axle 12a. The sleeve 10a is provided with a radially disposed external annular flange 13a. The supporting section is provided with a main side wall 15a having an inner annularly disposed flange 16a positioned to engage the flange 13a and to be removably secured thereto by means of bolts 17a. Said separable section is also provided with two inflation reservoirs I' and $I^2$ to receive inflating media through valves $V^3$ and $V^4$ respectively. There is also a pressure chamber A' located between the reservoir I' and $I^2$. The separable section is provided with a peripheral wheel rim R' which is of a width to support at least two tire casings T' and $T^2$ respectively, said rim being integrally connected with diverging walls 40 which are integrally connected to the side wall 15a, said diverging side walls and the rim providing an annular auxiliary reservoir $I^3$. The rim R' is provided with two sets of tire engaging flanges 21a, for receiving and retaining the tire casings in a manner well understood in pneumatic tire practice, so as to provide cushioning chambers C' and $C^2$ respectively. The auxiliary reservoir $I^3$ communicates with the chamber $I^2$ through an opening 24a and with the pressure chamber $C^2$ by means of an opening 24b in the rim R'.

The reservoir $I^2$ is formed by providing the side wall 15a with an integral bottom wall 18a having a flange 19a, the peripheral wall of said chamber being formed by the rim R', which is also provided with an annular flange 41 extending radially inward therefrom. A concavo-convex backing plate 20a is integrally connected at its edges to the rim R' and to the bottom wall 18a.

The reservoir I' is constructed with the removable side wall 25a which is provided with an integral bottom wall 26a and a top wall 42, said bottom having a radial flange 27a. Integrally connected with the top and bottom walls is a backing plate 20b of concavo-convex cross section, but reversely positioned with respect to the backing plate 20a. The side wall 25a is provided with an annular outer flange 28a positioned to engage the complemental flange 23a formed on the front edge of the rim R', the two flanges being secured together by means of bolts 43. Removably secured to one side of the flange 41 by means of bolts 44 are the peripheral portions of two elastic diaphragms 29a and 29b respectively, the inner edges of said diaphragms being separated and clamped between flanges 45 and 46 respectively carried by a bottom piece 26b, and the flanges 27a and 19a respectively. The interposed bottom piece 26a is provided with a valve $V^5$ for the introduction of pressure medium. The two inflating medium reservoirs I' and $I^2$ are each provided with cooling pipes P' which establish communication between the space surrounding the hub and the external atmosphere through the side walls 15a and 25a respectively. As in the other form the space which surrounds the hub is normally closed by a removable hub cap $H^2$ having louvred openings O' in the curved wall of the cap so as to deliver air under sufficient pressure to cause it to circulate through the pipes P' and thereby keep the reservoirs I' and $I^2$, and other parts of the wheel from becoming overheated while in operation. The reservoir I' communicates with the cushion chamber C' through the medium of registering openings 40 in the rim R' and the top wall 42. Each chamber C' and C² is provided with a vent pipe 36a, the pipe of chamber C' venting through a valve V⁶ in the rim and communicating with the space between the flange 23a and the tire engaging rim. The vent pipe 36a of chamber C² is connected with a valve V⁷ extending through the wheel rim R'.

The advantages of the invention will be readily understood by those skilled in the art to which it belongs. For instance, it will be readily seen that by maintaining a liquid tight joint between the tire casing and the wheel rim, a liquid inflating medium may be employed, and that ample cushioning means against shock are provided. A further important advantage is that the diaphragm 25 is located in a position where it is not normally subject to puncture or other damage incident to wear that are commonly experienced in the operation of vehicles equipped with pneumatic tires. A further advantage is that a very strong and sturdy cushioning means is provided which will adequately compensate for the most severe shocks which a vehicle wheel may be expected to encounter during normal operation, thereby protecting the wheel from damage, and the vehicle and passengers from injury. Another advantage is that a simple and efficient means is provided for preventing overheating of the tire and wheel during normal operation.

Having thus explained the nature of the invention and described an operative manner of constructing and using the same, although without attempting to set forth all of the forms in which it may be made, or all of the forms of its use, what is claimed is:

1. In a vehicle wheel, a wheel section comprising an inside wall having spaced integral rim and bottom wall portions, a rigid outside wall arranged in spaced relation to said inside wall and in tight connection with said rim and bottom wall portions, an elastic diaphragm interposed between said walls providing a reservoir between said diaphragm and said inside wall and an air chamber between said diaphragm and said outside wall, a tire on said rim, said reservoir communicating with said tire and adapted to contain liquid, means for venting said tire, and an inflating valve for said air chamber.

2. In a vehicle wheel, a wheel section having a rigid inside wall, a rim and a bottom wall portion, a separable section for said wheel section also having a rigid wall in tight connection with said rim and bottom wall portions, said walls disposed in spaced relation, an elastic diaphragm interposed between said walls to provide a reservoir between said diaphragm and said inside wall and a chamber between said diaphragm and said outside walls, an inflatable tire on said wheel section in communication with said reservoir, an air vent for said tire, means whereby liquid may be introduced to said reservoir, and means for supplying air pressure to said chamber.

3. In a vehicle wheel, an annular wheel section comprising an inside wall having a rim and a bottom section, a perforate rigid wall in said wheel section spaced from said inside wall and connecting said rim and bottom section, a separable section secured to said wheel section, a rigid wall on said separable section spaced from the rigid wall of said wheel section, an elastic diaphragm carried by said separable section spaced from both of said rigid walls in tight connection with said rim and bottom wall portions, said diaphragm providing an air chamber between said diaphragm and said rigid wall and a reservoir between said diaphragm and said inside wall, a tire on said rim in restricted communication with said reservoir, an air vent for said tire, a liquid filling valve for said reservoir, and an air filling valve for said chamber.

4. In a vehicle wheel, a main wheel section including an inside wall, a tire rim and a bottom wall spaced from one another and integral with said side wall, a perforate backing plate integral with said rim and said bottom wall and spaced from said inside wall, a tire on said rim, an outside wall secured at said rim and at said bottom wall and in spaced relation to said backing plate, a diaphragm interposed between said outside wall and said backing plate to provide an air chamber between said wall and plate and a reservoir between said diaphragm and said inside wall, said rim having an opening therein to establish communication between said reservoir and said tire, means for venting said tire, and an inflating valve for said air chamber.

GEORGE M. BRANDON.

REFERENCES CITED

The following references are of record in the file of this patent:

UNITED STATES PATENTS

| Number | Name | Date |
| --- | --- | --- |
| 1,247,681 | Howard | Nov. 27, 1917 |
| 2,014,618 | Haines | Sept. 17, 1935 |
| 2,024,040 | Hallingsworth | Dec. 10, 1935 |
| 2,053,735 | Overholser | Sept. 8, 1936 |
| 2,222,047 | Snyder | Nov. 19, 1940 |